July 30, 1946.     P. H. CRAIG     2,405,089
GASEOUS DISCHARGE DEVICE
Filed Sept. 3, 1943     3 Sheets-Sheet 1
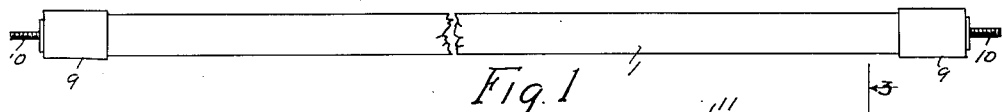
Fig.1
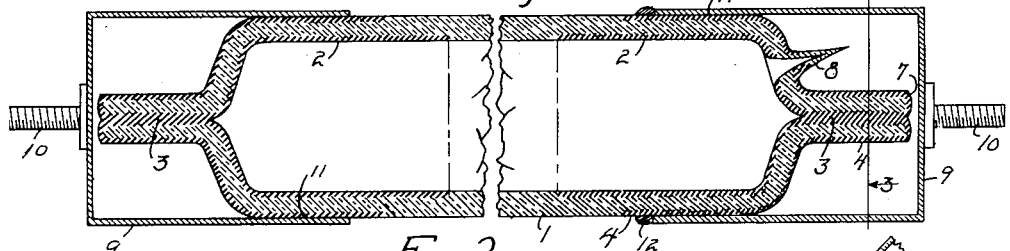
Fig.2
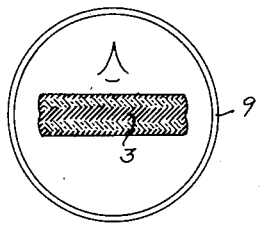
Fig.3
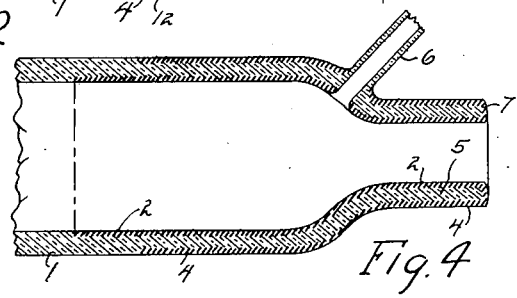
Fig.4
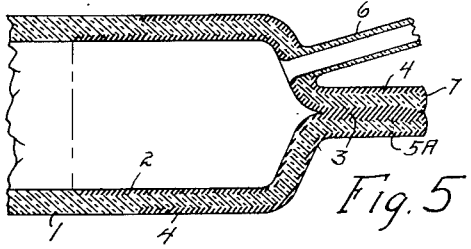
Fig.5
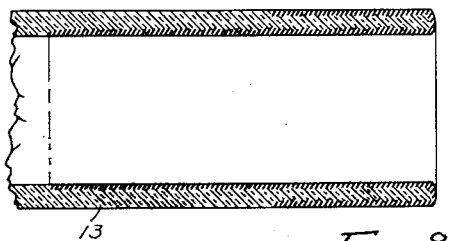
Fig.8     Fig.6
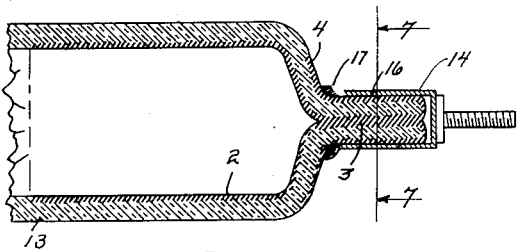
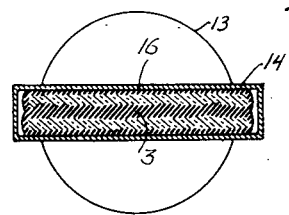
Fig.7
Inventor
Palmer H. Craig
By Harry P. Canfield
Attorney INVENTOR.
Palmer H. Craig
BY Harry P. Canfield
attorney July 30, 1946.  P. H. CRAIG  2,405,089
GASEOUS DISCHARGE DEVICE
Filed Sept. 3, 1943  3 Sheets-Sheet 3
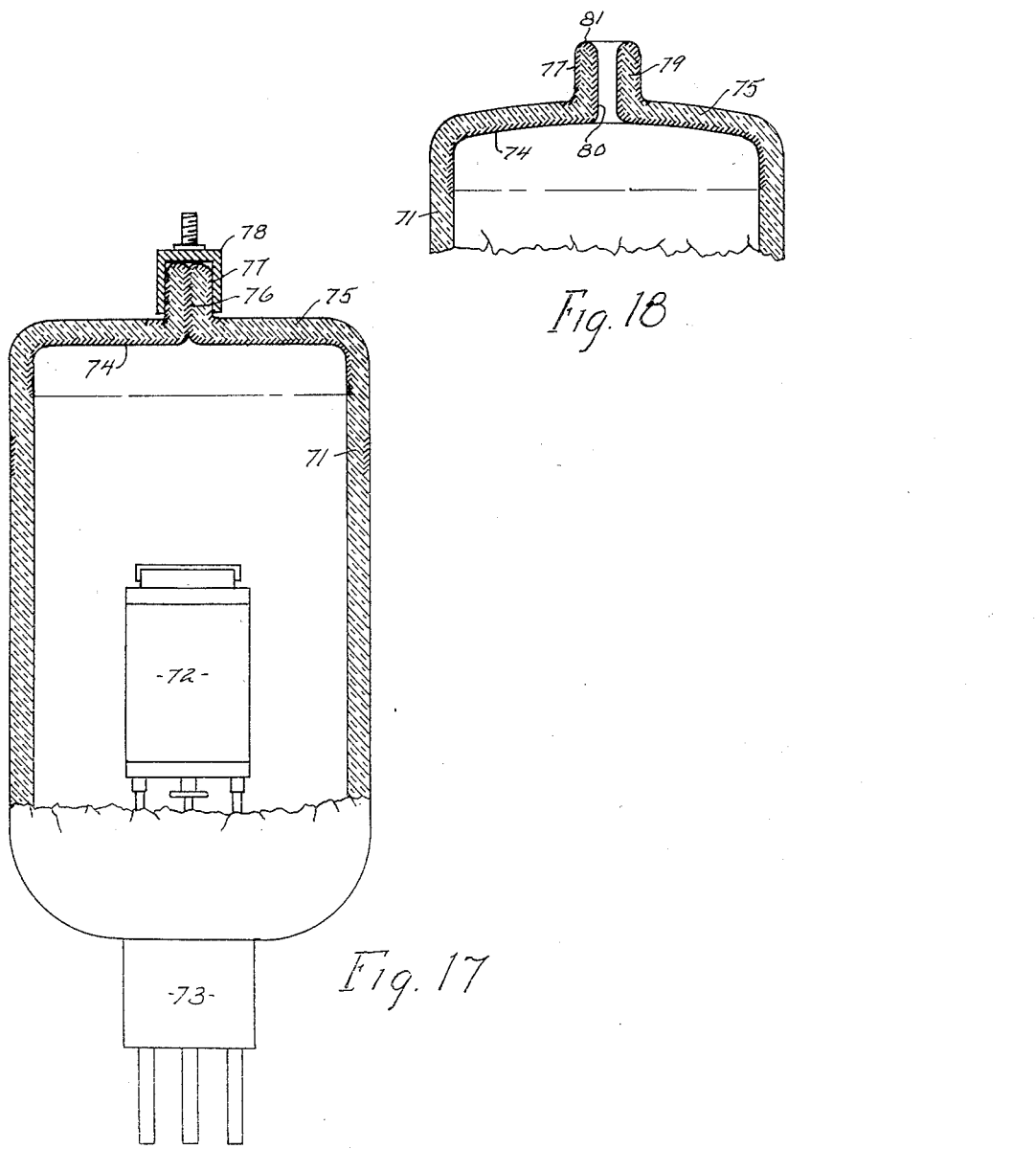
INVENTOR.
Palmer H. Craig
BY
Harry R. Canfield
attorney Patented July 30, 1946

2,405,089

UNITED STATES PATENT OFFICE 2,405,089

GASEOUS DISCHARGE DEVICE

Palmer H. Craig, Gainesville, Fla., assignor, by mesne assignments, to Invex Inc., a corporation of Florida Application September 3, 1943, Serial No. 501,069

7 Claims. (Cl. 176—122)

This invention relates to space discharge tubes, such as gaseous discharge lamps, electronic rectifier type tubes, etc.

Such lamps or tubes comprise in general a glass bulb or tube, and spaced electrodes therein between which electric current flows through gas or vapor at reduced pressure in the tube. In the case of a lamp, the gas becomes luminous and gives off light, the color of the light depending upon the particular gas used. One general class of such lamps is commercially referred to as "neon lamps" regardless of whether the gas is neon or some other gas, and they are used extensively in advertising signs. Another class of such lamps are the so-called "fluorescent" lamps, in which light emitted from a luminous gas actuates a coating on the tube wall and causes it to emit light.

In the case of a rectifier tube, the light given off by the gas or vapor is incidental.

The present invention relates more particularly to the construction of the tube at its end where the discharge electrode is incorporated in the tube structure, and to the construction of the electrode itself, and the external electric connection thereto.

In the case of lamps of this class, difficulties have heretofore been encountered in their construction. To prevent the metal of the electrodes from emitting impurities into the gas and contaminating it and thereby changing the original color of the light, and to prevent the deposit of material on the tube wall, all of which shortens the effective life of the tube, it has been necessary to drive out such impurities by the application of heat at the time of evacuating the tube; and it has been found difficult to construct and arrange the metal electrodes so that when heated their thermal expansion will not crack the lamp.

Also the metal of the electrodes as heretofore constructed tends to evaporate or disintegrate during operation, causing a deposit of the metal to form on the tube walls and causing contamination of the gas, and to prevent this or reduce it to a negligible minimum with the metal electrodes heretofore employed, it has been found necessary to make them of large size to give them a sufficiently large surface area, one critical area value having been established at not less than 1.5 square decimeters per ampere, and such massive electrodes have increased the difficulty of complete scavenging of impurities during evacuation, and have prohibited the use of the more desirable electrode metals, such as gold, platinum, etc., because of the cost thereof.

In the case of rectifier discharge tubes, difficulties have been encountered because the glass envelopes of such tubes are usually made of hard or tempered glass and the conductor to the electrode, for example to the anode, must be sealed to the glass envelope where it passes through it and the differences in the thermal expansion coefficients of the metal conductor and the glass causes the glass to crack unless particular metals such as tungsten, molybdenum or synthetic metal alloys are used for the conductor and these are expensive.

It is the primary object of this invention to provide a lamp or tube of the class referred to in which these difficulties have been overcome in an improved manner.

The invention utilizes in an improved manner certain properties of metal and glass intermingled and fused together into an integral mass; which for the purposes of this specification will be referred to and described as "metallic glass" it being a material having the properties of both metal and glass; and the process of producing and applying it and its uses will be described hereinafter.

Other objects of the invention are:

To provide in a gaseous discharge tube or lamp of the type in which an electric discharge is produced within a glass walled tube, improved means for conducting electric discharge current through the glass wall of the tube;

To provide generally an improved gaseous discharge tube or lamp;

To provide an improved construction of electrode for gaseous discharge tubes or lamps.

Other objects will be apparent to those skilled in the art to which my invention appertains. My invention is fully disclosed in the following description taken in connection with the accompanying drawings in which, Fig. 1 is a small scale view illustrating in elevation a lamp embodying my invention;

Fig. 2 is a longitudinal sectional view to enlarged scale of the lamp of Fig. 1 and illustrating one embodiment of my invention, the thickness of the glass wall of the lamp of the tube being magnified for illustrative purposes;

Fig. 3 is a sectional view taken from the plane 3—3 of Fig. 2;

Figs. 4 and 5 are views illustrating steps of the process of making the lamp of Fig. 2;

Fig. 6 is a view similar to a part of Fig. 2 illustrating a modification embodiment of my invention;

Fig. 7 is a sectional view taken from the plane 7—7 of Fig. 6;

Fig. 8 is a view illustrating a step of the process of making the lamp of Fig. 6;

Figure 12:
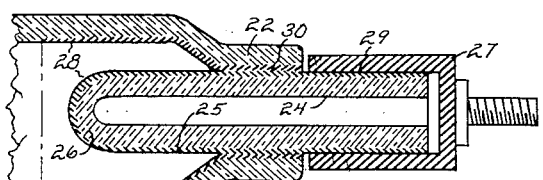
Figure 15:
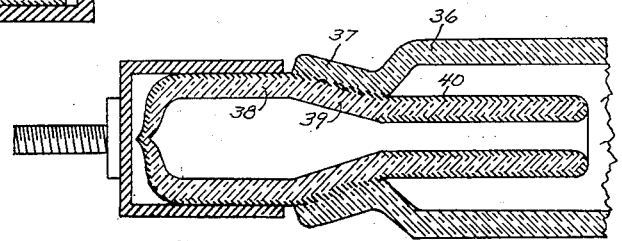
Figure 13:
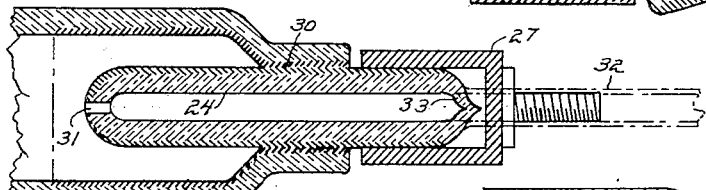
Figure 16:
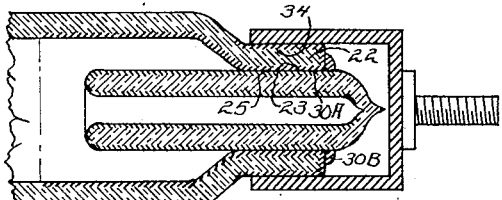
Figure 14:
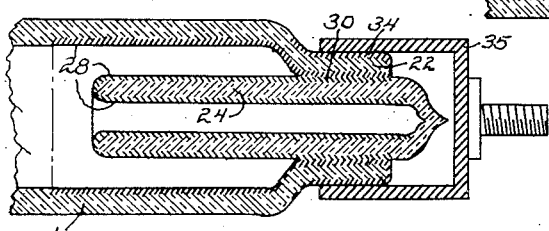

Figs. 9, 10, 11, and 12 are views in general similar to a part of Fig. 2 illustrating another form, these views illustrating also successive steps of the process of making this form;

Figs. 13, 14, and 15 are views in general similar to Fig. 12 but illustrating modifications;

Fig. 16 is a view similar to Fig. 14 illustrating a modification;

Fig. 17 is a longitudinal sectional view of an electronic tube of the rectifier type with my invention applied thereto;

Fig. 18 is a fragmentary view of a part of Fig. 17 illustrating a step of the process of making the tube of Fig. 17.

Referring to the drawings I have shown at 1 the glass walled tube proper of the lamp. The construction at the opposite ends of the tube may be similar and they are so illustrated, and a description of one will suffice for both. The inner surface of the tube at the end portion thereof has thereon or has incorporated therewith, an electrode in the form of a skin or layer 2 of the "metallic glass" identified above; and this metallic glass continues sealedly as at 3 uninterruptedly and integrally through the glass end wall of the tube, thereat constituting an electric current conducting portion; and the portion 3 continues uninterruptedly as at 4 over the outer surface of the tube, providing an electric contacting portion.

Before proceeding to further description of the lamp as a whole, this "metallic glass," certain properties of which I utilize, and the process of producing it, will first be described.

In the drawings as referred to above, this metallic glass has for practical illustrative purposes been shown as a distinct metal layer or surface skin superimposed upon the glass surface. But in fact it is not actually superimposed upon the surface but is an integral part thereof, extending for a substantial distance inwardly from the surface.

While its exact physical molecular character is not at this time fully known, it appears to be a mixture of the molecules of the glass and molecules of metal; the metal being one chosen for the desired purposes and adaptable to the process of producing the skin or layer, and the noble metals such as platinum, gold, silver, are preferred.

This metallic glass has properties of both metal and glass to wit: it is electrically conducting; it has very low specific ohmic resistance; solder will adhere firmly thereto and metal articles may therefore be soldered to it; and I have found that two bodies or parts of glass having each a skin of metallic glass thereon, may be completely heat-fused together on their metallic glass portions into a single fused integral mass (just as if the metallic skins were absent) and that then the metallic glass within the fused glass provides an electrically conducting path through it.

The preferred process of producing such metallic glass will now be described for the metal gold.

I first make a colloidal substance of powdered metal, a liquid vehicle and a flux. Suitable ingredients and proportions for such a substance are equal parts by weight of "brown powdered gold" (which is a black commercial mixture of powdered gold and borax); and a vehicle such as turpentine and in some cases if desired, turpentine and lavender oil. This produces a black colloid of the consistency of thick cream.

This colloid is then painted or otherwise applied upon the glass surface, or the glass is dipped into it, and because of the thick colloidal consistency of the substance, it adheres to the glass in a thick layer.

The colloid is then reduced to a dried black coat by evaporation, accelerated by mild heat if desired.

Heat is then applied to raise the temperature of the glass and the dried coat, final temperature of 700° F. having been found suitable. This temperature is maintained for a few minutes and transforms the glass and the black dried layer into "metallic glass" referred to. The color of the metallic glass is that of pure gold; its surface texture is that of glass; it reflects light the same as adjacent parts of the glass; it is impalpable being substantially flush with the surrounding glass surface.

I am aware that processes have been proposed for ornamenting glassware with designs having the appearance of metal, by painting preparations comprising a salt of a metal in solution in an oil vehicle and then drying and heating the same. But as herein described it is the electrical and mechanical properties of the mutually incorporated glass and metal that are utilized, and the process herein described produces a skin or layer of metallic glass material of greater depth in the glass and of greater proportional metal component, and of greater electrical conductivity than is possible with the prior glass ornamenting process referred to; and these improved properties of the metallic glass produced by the process when applied in the construction of a gaseous discharge lamp function electrically and mechanically in an improved manner not possible with the utilization of said glass ornamenting process.

Returning now to the lamp structure of Fig. 2, its further description will be considered in connection with the more important steps of making it.

The glass tube is first formed as in Fig. 4, the end portion being of reduced diameter as at 5. A tubulation 6 is added for evacuation and filling purposes, located preferably on the portion intermediate the large and small diameters.

A metallic glass skin comprising a portion 2 on the inner surface, a portion 4 on the outer surface, and a connecting portion 7 on the end of the tube, are then produced as above described.

The end portion of the tube is then heated to render it malleable and then the small diameter portion 5 is collapsed by a pinching device, die or the like, into the condition at 5A, Fig. 5, the temperature on the inside of the collapsed portion being sufficient to cause it to fuse together into a solid mass as shown.

The inside metallic glass 2, at the fused end portion, thus becomes, as at 3, a double-thickness electrically conducting mass sealed within the fused mass of glass and electrically connected to the remaining skin portions 2, 4, and 7. When both ends of the tube have been operated upon in this manner, the tube is evacuated through the tubulation 6 and gas introduced therethrough and the tubulation is then sealed off as at 8 in Fig. 2.

A metal terminal cup 9 having a threaded terminal 10 is telescoped over the tube and over the tubulation and is soldered to the outer skin 4 at 11 and if desired, an annular ring or spots of solder 12 may be applied to additionally secure the terminal cup in place. The solder connection between the terminal and the skin 4 electrically connects them.

In operation, current flows through the cup 9, outer skins 4 and 7, conducting path 3 to the inner skin 2, the latter being the main electrode of the lamp.

The form of Figs. 6 to 8 is the same as that described except that the tube to start with, here 13, is of the same diameter to the end. When heated, collapsed, pinched and fused as in Fig. 6, the pinched end will ordinarily spread out to a greater width than that of the original tube diameter as shown in Fig. 7 and the terminal cup 14 is telescoped over and soldered upon the pinched end as at 16—17 and in generally of rectangular form in cross section as shown. This form may be somewhat cheaper to manufacture than the above described form. Its operation however is that of the first described form.

The discharge electrodes 2—2 above described having gold as their metal component, have the advantage of being chemically inactive with carbon dioxide.

It is known that a carbon dioxide gas lamp emits a white light, spectrally substantially the same as sunlight, and is therefore highly desirable but it has heretofore not been commercially practicable to produce a carbon dioxide lamp partly because the only electrode metals which will not be chemically acted upon by the gas and contaminate it (which changes its color and/or forms a deposit on the tube wall) are expensive metals such as gold or platinum and these metals are prohibitively expensive when used for the massive electrodes heretofore thought to be necessary as mentioned above. The nearest approach to a white light heretofore attained commercially and economically in such lamps has been that produced by a mixture of gases for example neon gas and mercury vapor.

However, the quantity of gold required in the making of a durable long life electrode by the above described process is so very small that its cost is not prohibitive and my invention therefore opens up the commercial field for white light carbon dioxide tubes. Furthermore, the fused incorporation of the gold with the glass in the electrode as described above, binds the metal in metallic glass state and reduces the evaporation of the metal in operation to a negligible amount thereby adding to the effective life of the lamp.

In view of the process above described, it is believed correct as a matter of terminology herein to say that the electrode is composed of "metallic glass," the preferred metal component of which is gold, and that the current to this electrode is conducted over a "metallic glass" path through the glass wall of the tube.

While the lamp above described may be used with various gases to emit light of various colors, perhaps the most important field of application is as mentioned in the production of white light by the use of carbon dioxide gas in the tube.

The spectrum of luminous carbon dioxide when it is made luminous by a so-called electric discharge through it between electrodes, corresponds closely to the spectrum of sunlight; and it corresponds thereto even more closely and is maintained in such close correspondence over a long period of operative time when contamination of the gas by the escape of electrode molecules and atoms into the gas is prevented by the utilization of electrodes of gold whose molecules are interlocked or entrapped or bound with the molecules of the glass in the process of forming the electrode as described herein.

Obviously on inspection of the drawings the discharge supporting area of the electrodes 2—2 may be made as great as desired. It is shown as covering the end wall and a part of the side wall when these walls have the normal shape of a closed end tube, and as will be understood these walls may be given any other desired configuration some of which will presently be described.

The construction above-described has low electrical resistance and generates a negligible amount of heat. What heat is generated is conducted directly into the glass wall proper and is rapidly radiated off.

Figure 10:
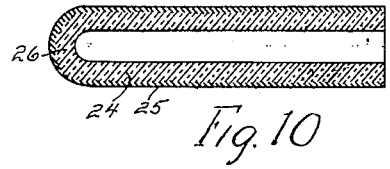
Figure 9:
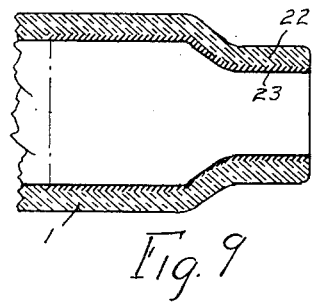

In the modifications of Figs. 9 to 16, provision is made to increase the cross sectional area of the conducting path through the tube end wall. In the form of Figs. 9 to 12 inclusive, the main body 1 terminates as shown in Fig. 9 in a neck 22 of reduced diameter. A layer of metallic glass 23, the metal component of which is preferably gold, is fused upon the inner wall surface extending to the end of the neck 22. As shown in Fig. 10 a tube 24, the outside diameter of which is slightly smaller than the inside diameter of the neck 22 is provided, and a like fused skin or layer 25 is formed on its outer surface the inner end of the tube being closed as at 26.

Figure 11:
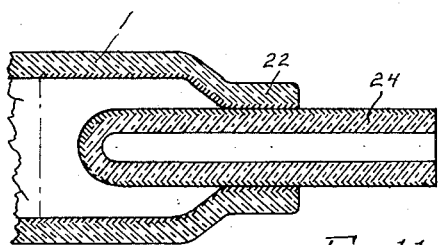

The tube 24 is inserted into the neck 22 as shown in Fig. 11, the closed end projecting beyond the neck.

Heat is now applied to fuse to a solid mass the neck 22, the adjacent wall portion of the tube 24 and the metallic glass skins or layers respectively, and into the state indicated in Fig. 12.

A cup-form terminal 27 is telescoped over the outer end of the tube 24 and may be soldered to the skin 25 on the tube 24 as described above.

In this form the electrode, here 28, is partly on the inner wall of the tube 1 and partly on the outer wall of the tube 24 thus providing a multiplied electrode area, the outer wall of the tube 24 being in effect a part of the inner wall of the tube 1. The metallic glass on the outer end of the inner tube as at 29 provides a terminal contact area. The metallic glass conducting path through the solid glass wall from the terminal to the electrode is provided by the fusion of corresponding parts of the skins or layers 23 and 25 of the neck 22 and tube 24 respectively as indicated at 30.

The relatively large diameter of the tube 24 makes the cross section of the conducting path a relatively large diameter annulus of large carrying capacity and provides a great increase in the electrode area and provides a large contact area for the terminal.

In the form of Fig. 13 this same general structure is employed but here the tube 24 functions additionally as the tubulation for evacuating and filling. In this case the inner end of the tube 24 has a perforation 31 therein and the outer end of the tube has a small diameter extension indicated in broken line at 32. Evacuation and filling thus takes place through the perforation 31 and thereafter the outer end of the tube 24 is sealed off as at 33, this seal being covered by the terminal 27 when subsequently applied.

In the modification of Fig. 14 a construction similar to that of Fig. 13 is shown. Here however the inner end of the tube 24 is wide open and the electrode layer 28 besides covering the inner wall of the tube 1 and the outer wall of the tube 24 continues over the inner wall of the tube 24 and the conducting path 30 through the end wall continues integrally into a skin or layer of metallic glass 34 on the outer wall of the neck 22. The terminal 35 telescopes over the outer layer 34.

By this construction the electrode area is still further increased and the over-all length of the construction is shortened.

In Fig. 15 is illustrated a modification which may be employed in constructing the forms of Figs. 9 to 14 inclusive. The outer telescoping tubular part 36 is flared outwardly at its end as at 37. The inner telescoping part 38 has a corresponding tapering shoulder 39. When the parts are heated to fusing temperature pressure applied longitudinally will aid in effecting integral union of the parts.

This modification also shows a conducting path through fused-together parts when the conducting metallic glass is on only one of the parts, the inner one in the particular form illustrated, the outer one being without the skin of metallic glass and fused upon the metallic glass of the inner part. The electrode 40 in this form is on the inner part 39 only.

Referring again to Fig. 14 instead of heat-fusing together the two skins to form the integral juncture 30, this juncture may be a soldered juncture as shown in Fig. 16. The skins or layers 23 and 25 are provided as before and after the inner tube 24 is inserted into the end portion 22 of the outer tube 1, the skins 23 and 15 are soldered together as at 30A; and additional solder 30B may be applied if desired.

The above described embodiments of my invention show its application to gaseous discharge lamps. Figs. 17 and 18 show its application to one end of a rectifier-type electronic tube.

The tube chosen for illustrative purposes is one of the hot cathode type but tubes of the pool cathode type may be similarly constructed. The tube envelope 71 (greatly magnified as to wall thickness for illustrative purposes) contains in the lower portion a hot cathode 72 connected to a three prong terminal plug 73, these parts being well known.

The anode comprises a layer or skin 74 of metallic glass, preferably of platinum metal content, on the inner surface of the upper end wall 75 of the tube, continuing integrally outwardly in a conducting path of metallic glass 76 sealed through the end wall, and continuing into an external contact portion 77 to which a terminal 78 is connected.

The end wall 75 of the tube may be first formed as in Fig. 18 with a tubular neck 79. A continuous skin 74—80—81—77 is formed thereon as described above including the skin 80 on the inner tubular wall of the neck. The neck is then heated and pressed to collapse it to the state of Fig. 17, fusing the skin on the inner wall of the neck into a solid conducting mass 76 integral with the surrounding glass. The terminal 78 is then telescoped over it and contacts the outer skin 77 and may be soldered to it.

In the foregoing description, reference is made to soldering upon the skin of metallic glass and in such cases it may be advisable to use solder which has a low melting point and which at the same time is non-porous, illustrative of which solder is pure tin.

Also, in forming the said skins or layers of metallic glass by the process described, and where it is desired to increase the current carrying capacity of the skin or layer, it may be made correspondingly thicker by applying a coat of the said liquid preparation, drying and heating it to reduce it to metal or metallic glass, and then repeatedly applying other layers thereon one after the other in the same manner.

While the preferred metal component of the preparation or compound is gold, obviously compounds having other metal components may be used for example gold, silver, platinum, etc.

My invention is not limited to the exact details illustrated and described. Changes and modifications other than those shown and described may be made within the spirit of my invention and my invention includes all such as come within the scope of the appended claims.

I claim:

1. A gaseous discharge lamp comprising an elongated envelope of glass sealedly closed at both ends by glass end walls; a filling of gas in the tube at predetermined pressure; discharge supporting electrodes in the opposite ends of the tube each comprising electrode material consisting of molecules of metal intermingled with molecules of the inner glass wall surface of the envelope; a current conductor for the electrode comprising an uninterrupted continuation of the electrode material extending sealedly through the wall, and continuing uninterruptedly over a portion of the exterior wall of the envelope to provide a contact; and metal terminals connected respectively to the contacts at the opposite ends of the tube.

2. A gaseous discharge lamp comprising an elongated tubular glass envelope having opposite end portions of reduced diameter; a tubular glass insert closed at one end and projecting into each of the reduced diameter portions of the envelope and having a fused annular juncture therewith; a filling of gas in the envelope at predetermined pressure; a pair of discharge supporting electrodes at the opposite ends of the envelope on the inner wall thereof, each comprising electrode material consisting of molecules of metal intermingled with molecules of glass and the electrode material continuing over the inwardly projecting end portion of the tubular glass insert, and continuing sealedly through the said annular juncture, and continuing over a portion of the exterior wall surfaces adjacent to the said annular seal.

3. A gaseous discharge lamp comprising an elongated tubular glass envelope having opposite end portions of reduced diameter; a tubular glass insert closed at one end and projecting into each of the reduced diameter portions of the envelope and having a fused annular juncture therewith; a filling of gas in the envelope at predetermined pressure; a pair of discharge supporting electrodes at the opposite ends of the envelope on the inner glass wall comprising each molecules of metal intermingled with molecules of glass and continuing sealedly through the said annular juncture, and continuing over a portion of the exterior surfaces adjacent to the said annular seal.

4. A gaseous discharge lamp comprising an elongated envelope of glass sealedly closed at both ends by glass end walls; a filling of gas in the tube at predetermined pressure; discharge supporting electrodes in the opposite ends of the tube each comprising molecules of metal intermingled with molecules of the interior glass wall of the envelope; a current conductor for the electrode comprising a continuation of the molecularly intermingled metal and glass extending uninterruptedly and sealedly through the wall;

and an exterior contact comprising a continuation of the molecularly intermingled metal and glass of the conductor, on the exterior glass wall.

5. A gaseous discharge lamp comprising an elongated envelope of glass sealedly closed at both ends by glass end walls; a filling of gas in the tube at predetermined pressure; discharge supporting electrodes in the opposite ends of the tube each comprising molecules of metal intermingled with molecules of the interior glass wall of the envelope; a current conductor for the electrode comprising a continuation of the molecularly intermingled metal and glass extending uninterruptedly and sealedly through the wall; and an exterior contact comprising a continuation of the molecularly intermingled metal and glass of the conductor, on the exterior glass wall; and metal terminals connected respectively to the contacts at the opposite ends of the tube.

6. A gaseous discharge lamp comprising a closed and sealed walled envelope having spaced apart glass wall portions; a filling of gas in the envelope; a pair of luminous-discharge-supporting electrodes in the envelope integral with the glass wall portions respectively; each comprising electrode material consisting of molecules of metal intermingled with molecules of the glass wall portions and extending to a substantial depth into the glass wall portions; and conductor means for conducting current through the envelope wall into the envelope to one electrode and from the other electrode through the envelope wall and out of the envelope.

7. A gaseous discharge lamp comprising a closed and sealed walled envelope; a filling of gas in the envelope; the wall of the envelope at each of two spaced apart portions comprising a main glass wall and a re-entrant glass wall; a pair of luminous-discharge-supporting electrodes in the envelope each integral with a main wall and a re-entrant wall; and comprising electrode material consisting of molecules of metal intermingled with molecules of the glass of the main and re-entrant glass walls and extending to a substantial depth into the glass of the said walls; and conductor means for conducting current through the envelope wall into the envelope to one electrode and from the other electrode through the envelope wall and out of the envelope.

PALMER H. CRAIG.